(12) United States Patent
Lee et al.

(10) Patent No.: US 7,965,323 B2
(45) Date of Patent: Jun. 21, 2011

(54) FLICKER DETECTING CIRCUIT AND METHOD IN IMAGE SENSOR

(75) Inventors: Pyeong-Woo Lee, Chungcheongbuk-do (KR); Chae-Sung Kim, Chungcheongbuk-do (KR); Jeong-Guk Lee, Chungcheongbuk-do (KR)

(73) Assignee: Crosstek Capital, LLC, Wilmington, DE (US)

( * ) Notice: Subject to any disclaimer, the term of this patent is extended or adjusted under 35 U.S.C. 154(b) by 1026 days.

(21) Appl. No.: 11/642,597

(22) Filed: Dec. 21, 2006

(65) Prior Publication Data

US 2007/0146500 A1 Jun. 28, 2007

(30) Foreign Application Priority Data

Dec. 22, 2005 (KR) .................. 10-2005-0127857

(51) Int. Cl.
*H04N 9/73* (2006.01)
(52) U.S. Cl. .............. 348/226.1; 348/227.1; 348/228.1
(58) Field of Classification Search .................. None
See application file for complete search history.

(56) References Cited

U.S. PATENT DOCUMENTS

| | | | | |
|---|---|---|---|---|
| 2002/0158971 | A1* | 10/2002 | Daiku et al. | 348/226.1 |
| 2003/0112343 | A1 | 6/2003 | Katoh et al. | |
| 2003/0120365 | A1* | 6/2003 | Asano et al. | 700/86 |
| 2004/0001153 | A1* | 1/2004 | Kikukawa et al. | 348/226.1 |
| 2004/0016919 | A1 | 1/2004 | Daiku et al. | |
| 2004/0109069 | A1* | 6/2004 | Kaplinsky et al. | 348/226.1 |
| 2004/0201729 | A1* | 10/2004 | Poplin et al. | 348/226.1 |
| 2006/0061669 | A1* | 3/2006 | Jang et al. | 348/226.1 |
| 2006/0279641 | A1* | 12/2006 | Takahashi et al. | 348/226.1 |
| 2007/0146500 | A1 | 6/2007 | Lee et al. | |

FOREIGN PATENT DOCUMENTS

| | | |
|---|---|---|
| KR | 10-2004-0058806 | 7/2004 |
| KR | 100721664 | 5/2007 |

OTHER PUBLICATIONS

"Design of Efficient Flicker Detector for CMOS Image Sensor", (Proceedings of IEEK Fall Conference 2005 vol. 28,No. 2, pp. 739-742).
Taiwanese Office Action dated Jun. 17, 2010 (Translation provided).

* cited by examiner

*Primary Examiner* — David L Ometz
*Assistant Examiner* — Angel L Garces-Rivera
(74) *Attorney, Agent, or Firm* — McAndrews, Held & Malloy, Ltd.

(57) ABSTRACT

A circuit includes a luminance average value output unit for extracting luminance values from pixel data of the first and the second frames to generate first luminance average values for pixel lines of the first frame and second luminance average values for pixel lines of the second frame, a flicker curve generating unit for subtracting the second luminance average values from the first luminance average values, thereby generating a flicker curve, and a flicker detecting unit for extracting a plurality of local minimum points from the flicker curve, calculating a distance between each two neighboring local minimum points of the extracted local minimum points, and determining whether the flicker is present based on the distances and the frequency numbers of the distances.

71 Claims, 14 Drawing Sheets

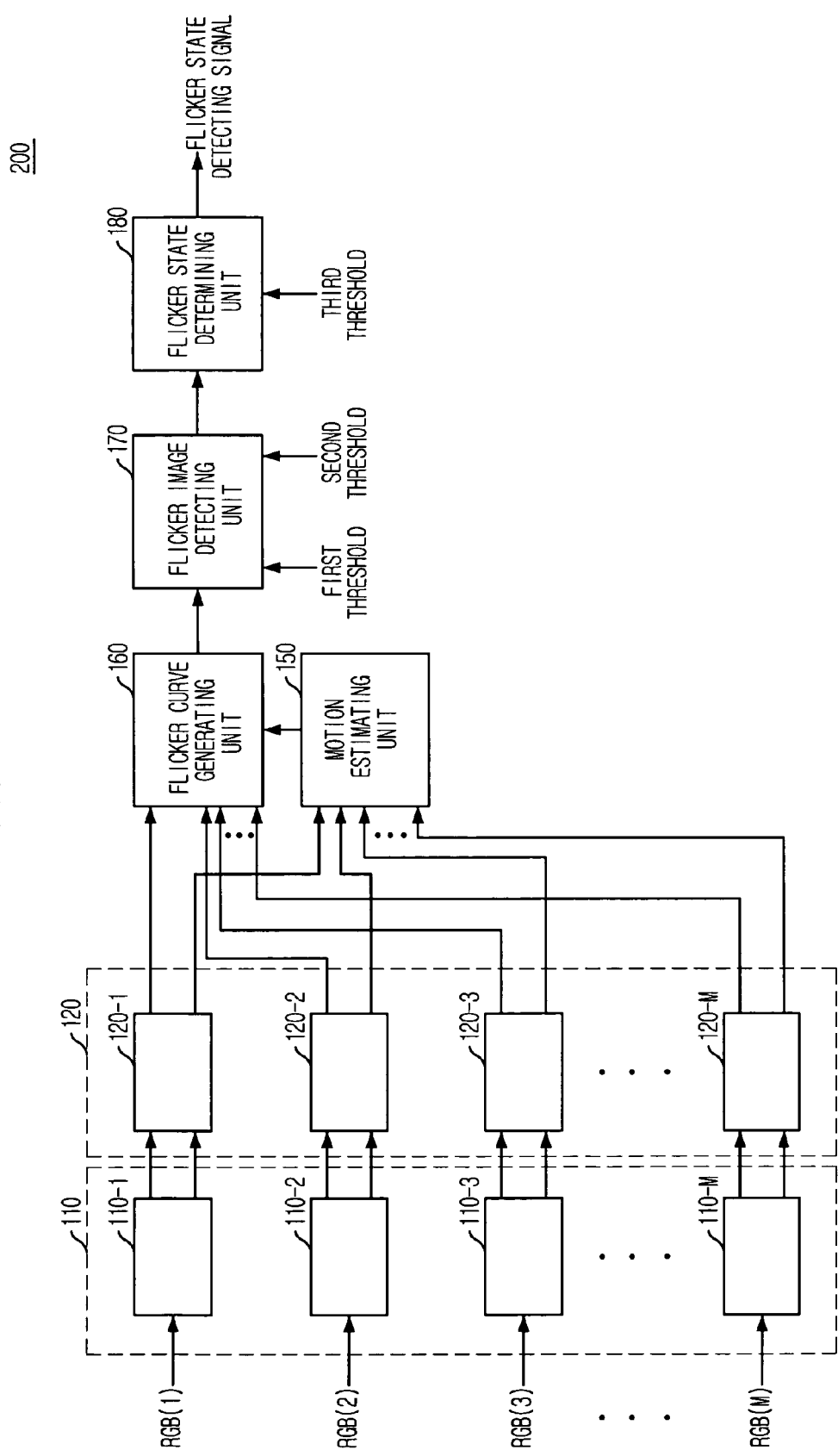

FLICKER DETECTING CIRCUIT AND METHOD IN IMAGE SENSOR

FIELD OF THE INVENTION

The present invention relates to a semiconductor design technique, and more particularly, a circuit and method for detecting a flicker in a band form in an image sensor.

DESCRIPTION OF RELATED ARTS

Recently, demand for digital cameras has explosively increased with the development of picture communications using the Internet. Moreover, demand for a compact camera module has increased as mobile communications terminals, such as Personal Digital Assistants (PDA), International Mobile Telecommunications-2000 (IMT-2000) terminals, and Code Division Multiple Access (CDMA) terminals, in which a camera is built, have become increasingly widespread.

The camera module essentially includes an image sensor. The image sensor typically is a device for converting an optical image into an electric signal. A Charge Coupled Device (CCD) and a Complementary Metal-Oxide-Semiconductor (CMOS) image sensor are widely used as such an image sensor.

The CCD disadvantageously has a complex driving method and a high power consumption. Further, the CCD has the disadvantages that the manufacturing process is complicated because the number of masking processes is large and a one-chip implementation is difficult because a signal processing circuit cannot be built in a chip. On the contrary, the CMOS image sensor is now more prevalent because it is possible to monolithically integrate a control circuit, a driving circuit and a signal processing circuit on a single chip. Moreover, the CMOS image sensor provides a lower voltage operation, a lower power consumption, and a potentially lower cost compared to the existing CCD owing to the compatibility with peripherals and the utility of the standard CMOS manufacturing process.

However, an analog signal introduced from a photo-receiving device, e.g., a photodiode, in the CMOS image sensor has diverse parasitic effects caused by a parasitic capacitance, a resistance, a dark current leakage, the inconsistency of features of a semiconductor device and so on. Such a parasitic effect essentially occurs in a semiconductor device and degrades a Signal to Noise Ratio (SNR) of image data. Thus the noise acts as a critical factor for limiting a performance of the image sensor.

Causes of noise in the CMOS image sensor may include kT/C noise related to a sampling of the image data, a 1/f noise related to a circuit used for amplifying an image signal, and a Fixed Pattern Noise (FPN) related to the inconsistent signal processing circuits in the image sensor. The FPN, among others, is visually very poor since it is seen in a vertical line or a strip form within the image and thus can easily be detected by human eyes.

Such a CMOS image sensor reads out data in a rolling shutter scheme, which sequentially reads out data in every row line from pixels aligned in a pixel array. The light intensity of one row line differs from that of another row line based on the standardized frequency 50 Hz or 60 Hz, inducing a flicker.

Hereinafter, the cause by which the flicker is induced in the image sensor employing the rolling shutter scheme is described.

As shown in FIG. 1, the flicker results from a difference between the light intensities of every row line in an image pickup device using a rolling shutter. This is because every country defines a rated electric frequency as, e.g., 50 Hz or 60 Hz (the rated electric frequency is defined as both 50 Hz and 60 Hz in Japan), so that the luminance of a lighting device is varied with time variation. A representative example using the rated electric frequency is a fluorescent lamp universally utilized in ones real life. When an object illuminated by the fluorescent lamp is photographed by using the image pickup device employing the rolling shutter scheme, the flicker is induced in a lateral band on an image of the object.

In order to prevent the induction of such a flicker, the difference between the light intensities of each row line as the cause of inducing the flicker has to be uniformly maintained. FIG. 2 shows a method for maintaining the difference between the light intensities of each row line, in which an exposure time of the image pickup device is fixed to a time assigned to the rated electric frequency, e.g., 50 Hz or 60 Hz. That is, if integer multiples of time assigned to the rated electric frequency is given as the exposure time of the image pickup device, the light intensities provided from every row line become equal. Therefore, it is required to adjust the at least common multiple of the exposure time of the image pickup device in compliance with the rated electric frequency per country. Especially, under an environment that two frequencies 50 Hz and 60 Hz are mingled as in Japan, there needs a circuit for properly and automatically adjusting the at least common multiple for the exposure time.

As mentioned above, in order to automatically adjust the at least common multiple of the exposure time of the image pickup device in compliance with the rated electric frequency, a flicker detector is required for determining whether the flicker is present or not under an actual environment. Further, when the flicker induced due to a difference between the exposure time of the image pickup device and the time assigned to the rated electric frequency is detected by the flicker detector, an automatic exposure correcting circuit is required to correct the difference therebetween.

Whether the flicker is present or not can be determined by one method of using a separate particular pixel array, and another method of using a pure digital signal processing.

The former method using the particular pixel array, which is constructed separately from a main pixel array, determines whether the flicker is present or not under an actual illumination environment, thereby analogizing the existence of the flicker in a photographed image. This method can obtain an exact flicker detective result but has a disadvantage that a hardware resource is wasted by the addition of the particular pixel array, and time and financial cost for designing and controlling the particular pixel array increase.

The latter method using the pure digital signal processing processes a tendency of the flicker which appears in a single or a plurality of images into information to generate a flicker curve, and then determines a periodicity of the flicker curve from the flicker curve, thereby analogizing the existence of the flicker. This method is relatively inexpensive in a designing cost compared to the former method using the particular pixel array, because a separate hardware resource is not required and sufficient simulative experiences are executable in a Field Programmable Gate Array (FPGA).

However, this latter method using the pure digital signal processing to determine whether the flicker is present requires another separate hardware resource, i.e., a Discrete-Fourier Transform (DFT) operator, for calculating a complex DFT operation to determine the periodicity of the flicker curve.

SUMMARY OF THE INVENTION

Embodiments of the present invention are directed to provide a flicker detecting circuit and method in an image sensor, for determining whether a flicker is present or not, while minimizing a semiconductor-implemented area and the hardware resources.

In accordance with an aspect of the present invention, there is provided A circuit for photographing an image to obtain a first frame and a second frame and detecting a flicker by using the first and the second frames, the circuit comprising: a luminance average value output unit for extracting luminance values from pixel data of the first and the second frames to generate first luminance average values for pixel lines of the first frame and second luminance average values for pixel lines of the second frame; a flicker curve generating unit for subtracting the second luminance average values from the first luminance average values, thereby generating a flicker curve; and a flicker detecting unit for extracting a plurality of local minimum points from the flicker curve, calculating a distance between each two neighboring local minimum points of the extracted local minimum points, and determining whether the flicker is present based on the distances and the frequency numbers of the distances.

In accordance with another aspect of the present invention, there is provided a circuit for photographing an image to obtain M frames and detecting a flicker by using the M frames, M being an integer larger than 2, the circuit comprising: a luminance average value output unit for extracting luminance values from pixel data of M−1 neighboring frame pairs among the M frames to generate first luminance average values for pixel lines of a first frame of each frame pair and second luminance average values for pixel lines of a second frame of said each frame pair; a flicker curve generation unit for subtracting the second luminance average values from the first luminance average values, thereby generating a flicker curve; a flicker image detecting unit for extracting a plurality of local minimum points from the flicker curve, calculating a distance between each two neighboring local minimum points of the extracted local minimum points, and detecting a flicker image based on the distances and the frequency numbers of the distances; and a flicker state determining unit for determining whether a flicker is present based on the detecting number of the flicker images when the detection of the flicker image is completed with respect to the M frames.

In accordance with still another aspect of the present invention, there is provided a circuit for photographing an image to obtain M frames and detecting a flicker by using the M frames, M being an integer larger than 2, the circuit comprising: a luminance average value output unit for extracting luminance values from pixel data of the M frames to generate luminance average values for pixel lines of each of the M frames; a flicker curve generating unit for calculating luminance average value differences between two frames constituting a frame pair based on the luminance average values for the pixel lines of the frame pair, the M frames being classified into (M−1) frame, thereby generating (M−1) flicker curves by using the differences; a flicker image detecting unit for extracting a plurality of local minimum points from each of the (M−1) flicker curves, calculating a distance between each two neighboring local minimum points of the extracted local minimum points, and detecting a flicker image from each of the flicker curves based on the distances and the frequency number of the distances; and a flicker state determining unit for determining whether the flicker is present based on the detecting number of the flicker images when the detection of the flicker images is completed with respect to all of the M frames.

In accordance with still another aspect of the present invention, there is provided a method for detecting a flicker in an image sensor, the method comprising: extracting luminance values from pixel data of a first frame obtained by photographing an image to generate first luminance average values for pixel lines of the first frame; extracting luminance values from pixel data of a second frame obtained by consecutively photographing the image to generate second luminance average values for pixel lines of the second frame; subtracting the second luminance average values from the first luminance average values to generate a flicker curve; and extracting a plurality of local minimum points from the flicker curve to calculate a distance between each two neighboring local minimum points of the extracted local minimum points and detecting a flicker image based on the distances and the frequency numbers of the distances.

In accordance with further still another aspect of the present invention, there is provided a method for detecting a flicker in an image sensor, the method comprising: extracting luminance and chrominance values from pixel data of a first frame obtained by photographing an image to generate first luminance average values and first chrominance average values for pixel lines of the first frame; extracting luminance and chrominance values from pixel data of a second frame obtained by consecutively photographing the image to generate second luminance average values and second chrominance average values for pixel lines of the second frame; estimating a motion of the second frame by using the first chrominance average values and the second chrominance average values; correcting the second luminance average values based on the estimated motion of the second frame; subtracting the corrected second luminance average values from the first luminance average values to generate a flicker curve; and extracting a plurality of local minimum points from the flicker curve to calculate a distance between each two neighboring local minimum points of the extracted local minimum points and detecting a flicker image based on the distances and the frequency numbers of the distances.

BRIEF DESCRIPTION OF THE DRAWINGS

FIG. 16 is a block diagram of a flicker detecting circuit in accordance with another preferred embodiment of the present invention.

DETAILED DESCRIPTION OF THE INVENTION

Figure 1:
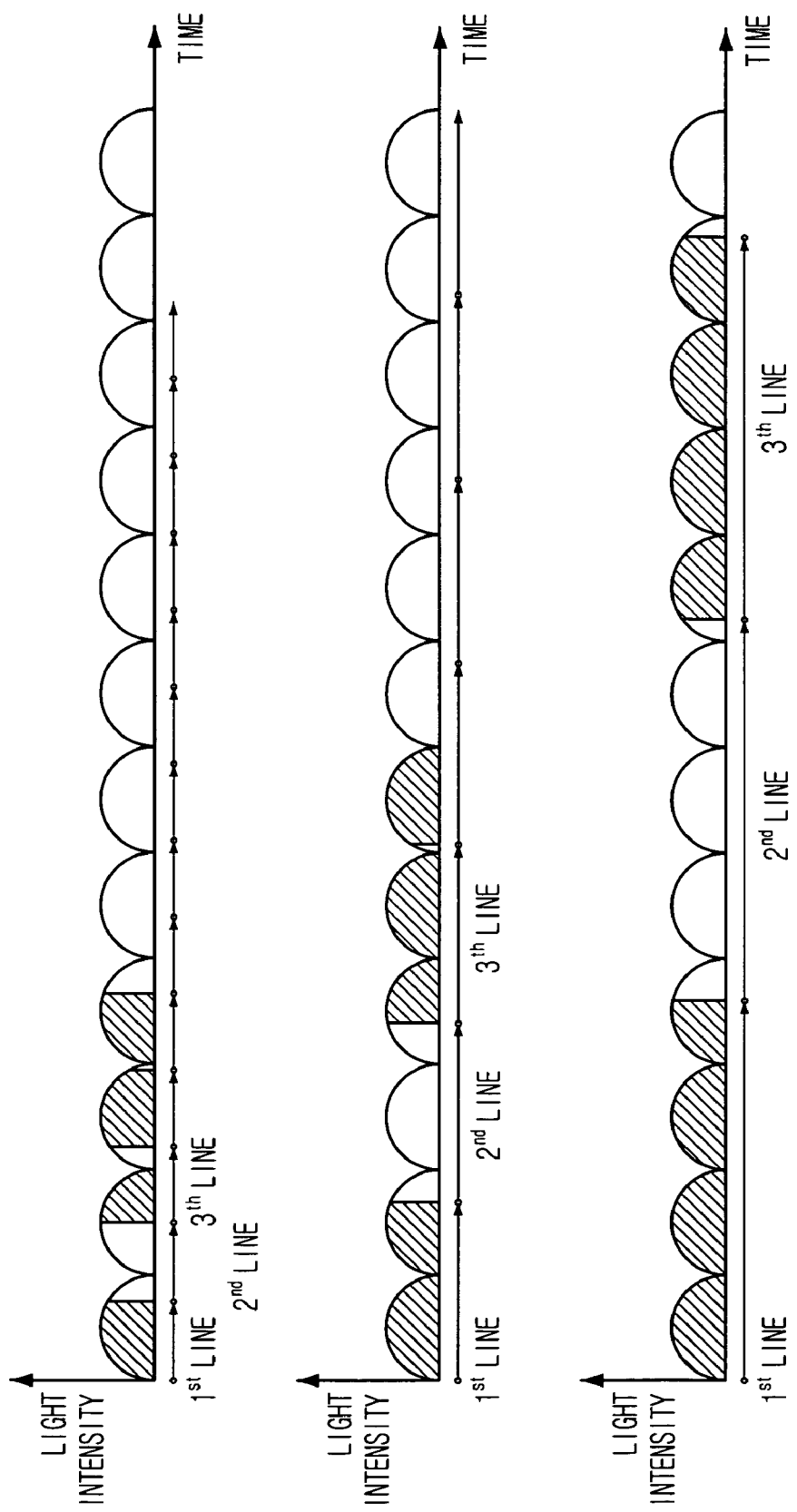
FIG. 1 is a view for illustrating a difference between the light intensities of every row line appearing in a typical image pickup device employing a rolling shutter method.
Figure 2:
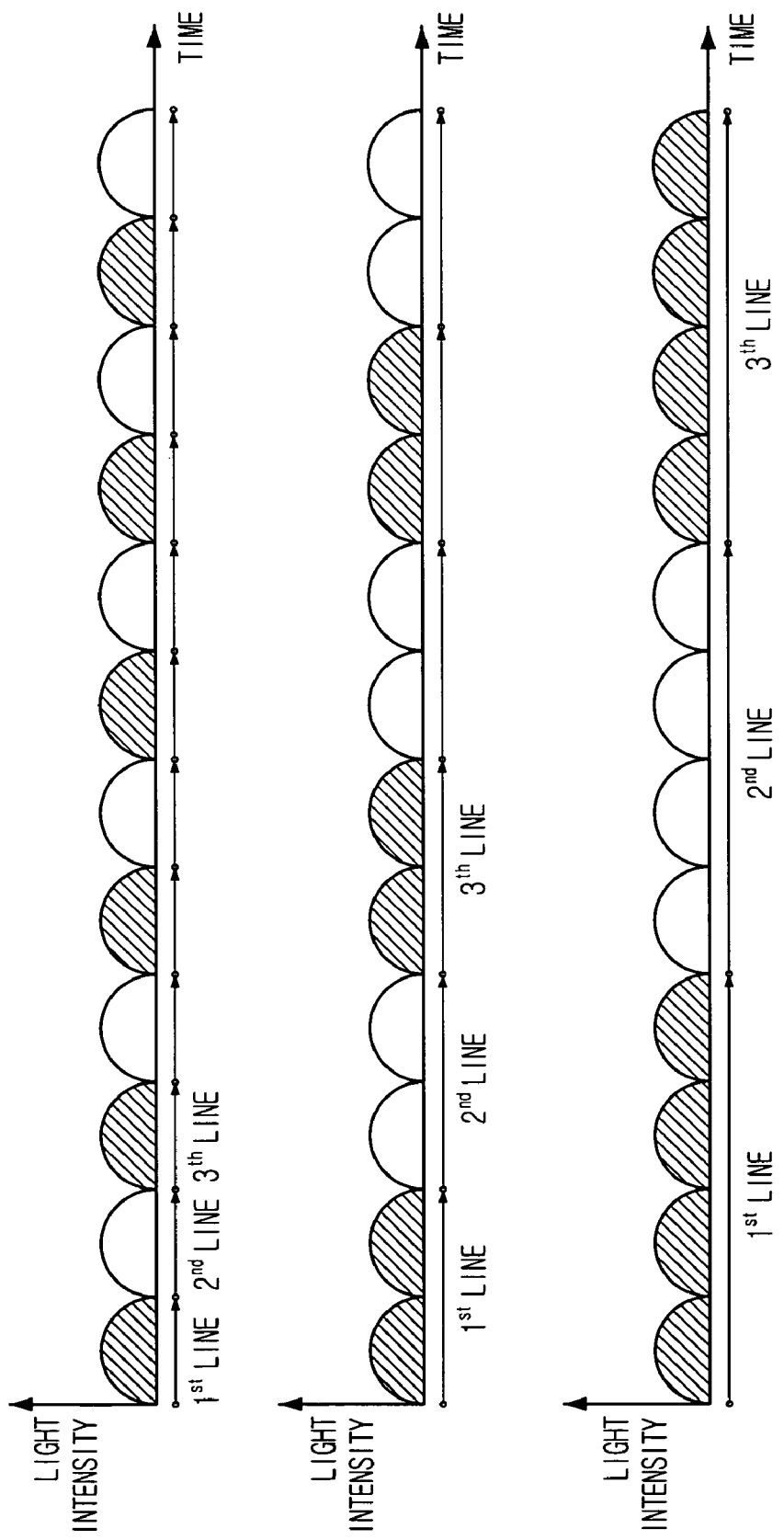
FIG. 2 is a view of illustrating a method for adjusting an exposure time, to uniformly maintain the difference between the light intensities of every row line appearing in a typical image pickup device employing a rolling shutter scheme.

Hereinafter, the preferred embodiments of the present invention will be described with reference to the accompanying drawings. In the description and the drawings, the identical reference numerals refer to as the identical elements performing the same functions.

Figure 3:
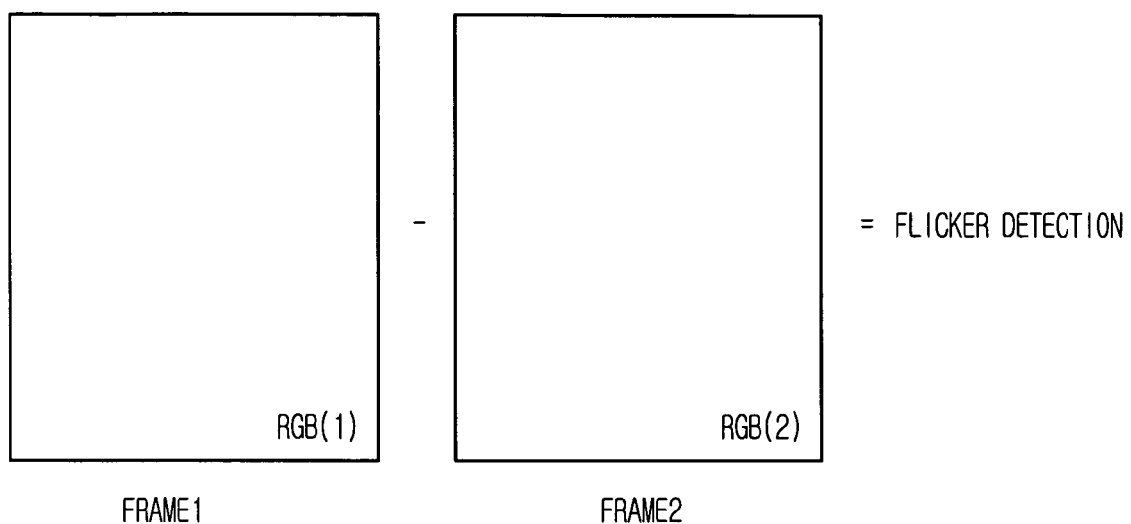
FIG. 3 is a conceptive view of illustrating a mechanism for detecting a flicker in an image sensor in accordance with the present invention.
Figure 4:
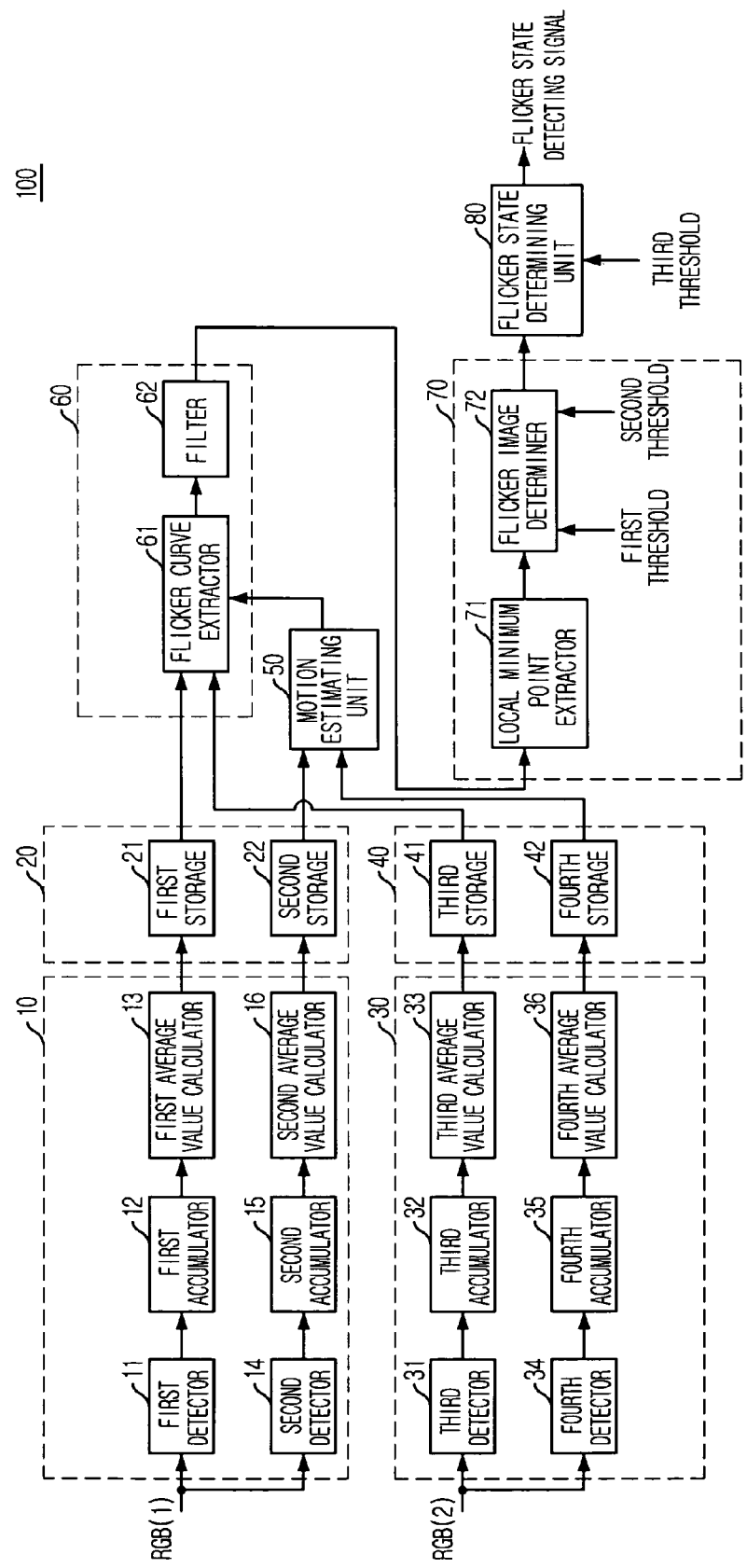
FIG. 4 is a block diagram of a flicker detecting circuit in accordance with a preferred embodiment of the present invention.

FIG. 3 is a conceptive view of illustrating a mechanism of detecting a flicker in an image sensor in accordance with a preferred embodiment of the present invention, and FIG. 4 is a block diagram of a flicker detecting circuit in the image sensor in accordance with the preferred embodiment of the present invention.

In FIG. 3, the mechanism for detecting the flicker in the image senor in accordance with the preferred embodiment of the present invention consecutively photographs one picture several times, e.g., twice, and detects the flicker by subtracting luminance values of a second photographed image (second frame FRAME2) of two photographed images from luminance values of a first photographed image (first frame FRAME1) of the two photographed images. That is, when luminance values for each pixel line detected from the second frame FRAME2 are subtracted from luminance values for each pixel line detected from the first frame FRAME1, information of an object in the first and the second frames FRAME1 and FRAME2 is removed and as a result there remains only a difference between the two frames, i.e., a lag of a flicker flow.

The flicker detecting circuit 100 shown in FIG. 4 includes a first luminance and chrominance average value generation unit 10 for detecting luminance values and chrominance values of pixel data RGB(1) to calculate a luminance average value and a chrominance average value for each row pixel line in the first frame FRAME1, a first storage unit 20 for storing the luminance average value and the chrominance average value for each row pixel line in the first frame FRAME1 output from the first luminance and chrominance average value generation unit 10, a second luminance and chrominance average generation unit 30 for detecting luminance values and chrominance values of pixel data RGB(2) to calculate a luminance average value and a chrominance average value for each row pixel line in the second frame FRAME2, a second storage unit 40 for storing the luminance average value and the chrominance average value for each row pixel line in the second frame FRAME2 output from the second luminance and chrominance average value generation unit 30, a motion estimating unit 50 for comparing the chrominance average value for each row pixel line in the first frame FRAME1 and that of the second frame FRAME2 respectively stored in the first and the second storage units 20 and 40 to estimate a motion of the second frame FRAME2, a flicker curve generating unit 60 for correcting the luminance average values of the second frame FRAME2 stored in the second storage unit 40 based on the motion estimated result from the motion estimating unit 50 and subtracting the corrected luminance average values of the second frame FRAME2 from the luminance average values of the first frame FRAME1, thereby generating a flicker curve, and a flicker image detecting unit 70 for determining by using the flicker curve whether a flicker image corresponding to the compared two frames is present or not.

Another preferred embodiment of the present invention may further comprise a flicker state determining unit 80, which obtains a plurality of (in particular, three or more) frames from the same picture, determines whether a flicker image is present or not in the plurality of frames, and as a result, determines whether a flicker is present or not in the photographed image.

The first luminance and chrominance average value generation unit 10 has a first detector 11 for detecting a luminance value for each pixel in the first frame FRAME1, a second detector 14 for detecting a chrominance value Cb/Cr for each pixel in the first frame FRAME1, a first accumulator 12 for accumulating luminance values detected and output from the first detector 11, a second accumulator 15 for accumulating chrominance values detected and output from the second detector 14, a first average value calculator 13 for calculating luminance average values of the accumulated luminance values from the first accumulator 12 in a manner that the luminance average values are calculated for row pixel lines in the first frame FRAME1, and a second average value calculator 16 for calculating chrominance average values of the accumulated chrominance values from the second accumulator 15 in a manner that the chrominance average values are calculated for the row pixel lines in the first frame FRAME1.

The first storage unit 20 has a first storage 21 for storing the luminance average values output from the first average value calculator 13, and a second storage 22 for storing the chrominance average values output from the second average value calculator 16. The first and second storages 21 and 22 subsequently store the luminance and chrominance average values for all row pixel lines of the first frame FRAME1, respectively.

The second luminance and chrominance average value generation unit 30 has a third detector 31 for detecting a luminance value for each pixel in the second frame FRAME2, a fourth detector 34 for detecting a chrominance value Cb/Cr for each pixel in the second frame FRAME2, a third accumulator 32 for accumulating luminance values detected and output from the third detector 31, a fourth accumulator 35 for accumulating chrominance values detected and output from the fourth detector 34, a third average value calculator 33 for calculating luminance average values of the accumulated luminance values from the third accumulator 32 in a manner that the luminance average values are calculated for row pixel lines in the second frame FRAME2, and a fourth average value calculator 36 for calculating chrominance average values of the accumulated chrominance values from the fourth accumulator 35 in a manner that the chrominance average values are calculated for the row pixel lines in the second frame FRAME2.

The second storage unit 40 has a third storage 41 for storing the luminance average values output from the third average value calculator 33, and a fourth storage 42 for storing the chrominance average values output from the fourth average value calculator 36. The third and fourth storages 41 and 42 subsequently store the luminance and chrominance average values for all row pixel lines of the second frame FRAME2, respectively.

In this case, it is possible to use a storage device for storing codes digitalized by an analog-to-digital converter in an image sensor, e.g., a Static Random Access Memory (SRAM), as the first and second storage units 20 and 40 as mentioned above.

When an object represented in the first frame FRAME1 and that represented in the second frame FRAME2 are unmatched by a shake, the motion estimating unit 50 estimates an offset of the second frame FRAME2 in order to correct the offset incurred in the second frame FRAME2.

That is, when an image pickup device photographs the first frame FRAME1 and subsequently the second frame FRAME2, if the object appears to be moved by the shake, the object represented in the first frame FRAME1 is unmatched to that represented in the second frame FRAME2, as a result of which the offset is incurred in the second frame FRAME2. The correction of such an offset is practicable by approaching the second frame FRAME2 to the first frame FRAME1.

As described above, in obtaining a difference between the luminance values for each row pixel line in the first and the second frames FRAME1 and FRAME2, when the object is moved, a flicker curve includes a lag with respect to the motion of the object as well as a flicker flow. Therefore, in the flicker curve, there is information of the object's motion in addition to information of the flicker. Such a phenomenon in a real life is usually caused by a shake when an image pickup device is supported by hands. Thus the flicker curve can be exactly extracted only after the phenomenon is compensated.

The motion estimating unit 50 estimates the object's motion by using the chrominance average values of the first and the second frames FRAME1 and FRAME2 respectively stored in the second and the fourth storages 22 and 42. Since the object's motion caused by the shake is usually an up and down motion, the motion estimation is achieved by moving in an up and down direction addresses of the fourth storage 42 that stores the chrominance average values of the second frame FRAME2, in up and down direction.

Figure 5:
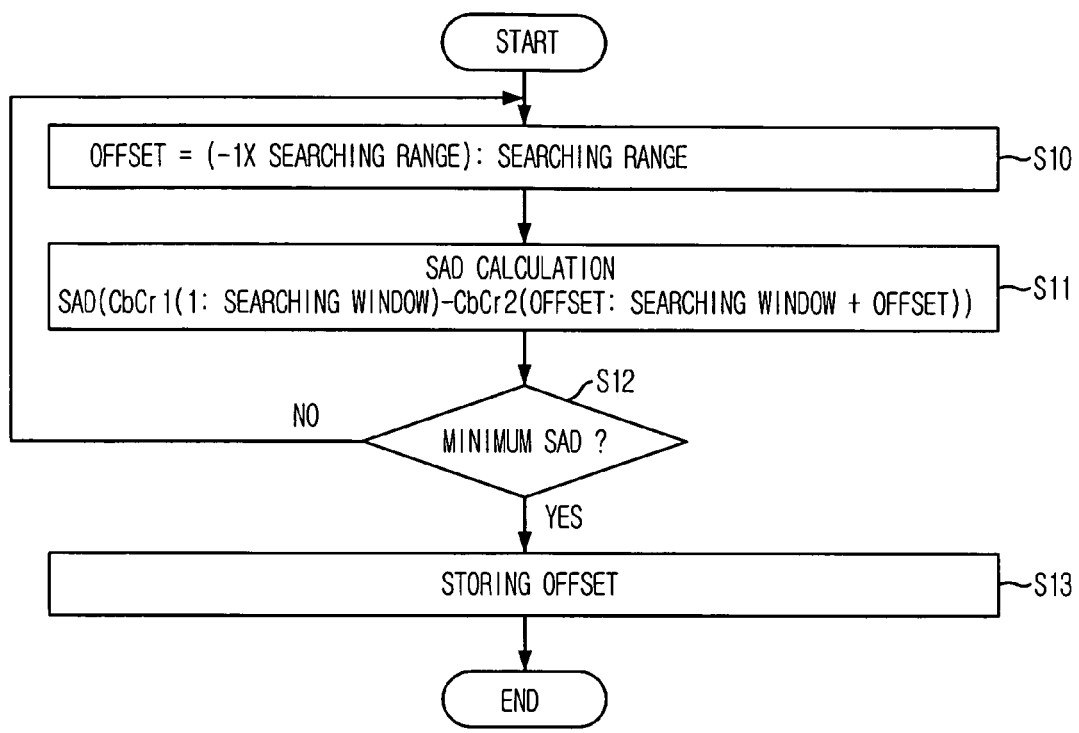
FIG. 5 is a flow chart of describing an operational characteristic of a motion estimator shown in FIG. 4.

An example of the motion (hereinafter, referred to as an offset) estimating method using the motion estimating unit 50 is shown in FIG. 5.

Referring to FIG. 5, in a certain region of the two frames FRAME1 and FRAME2, a value of sum of absolute difference (SAD) is repetitively obtained with fixing one frame FRAME1 and changing a reference value of the other frame FRAME2. At this time, as the reference value of the other frame FRAME2 is changed, a point having a minimum SAD is found at a particular reference value and the particular reference value is stored in a storage. Then after searching a range of all reference values, a reference value having a minimum value in the range of all reference values is determined and applied as a motion reference value. This is described by an example shown in FIG. 6.

Figure 6:
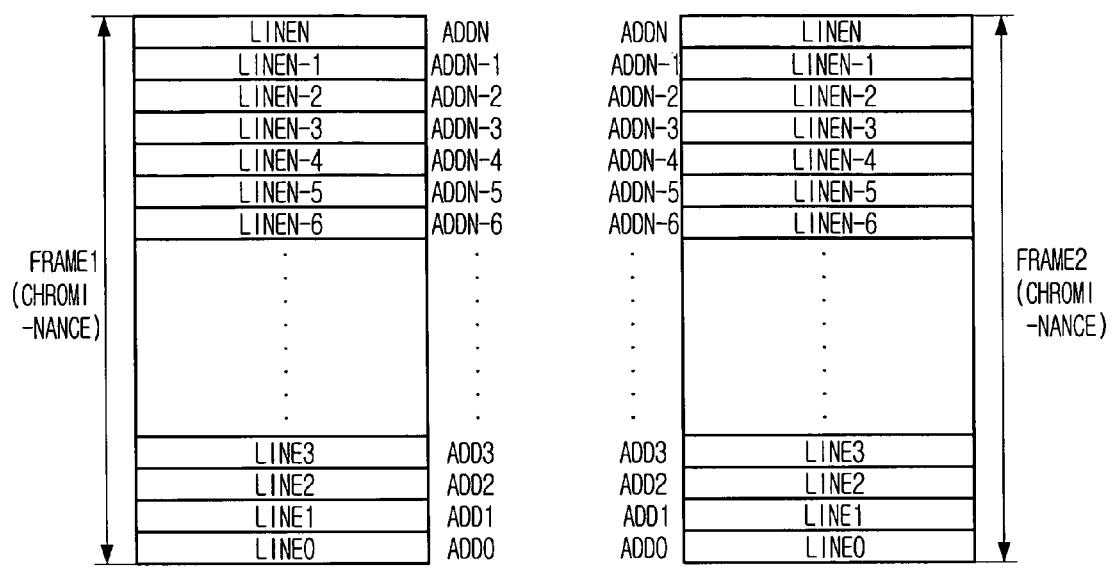
FIGS. 6 and 7 are views of illustrating a motion estimating method.

In FIG. 6, for the convenience of the explanation, it is assumed that the chrominance average values for row pixel lines LINE0 to LINEN of the first frame FRAME1 are sequentially stored in the second storage 22 and the chrominance average values for row pixel lines LINE0 to LINEN of the second frame FRAME2 are sequentially stored in the fourth storage 42, N being a positive integer.

Figure 7:
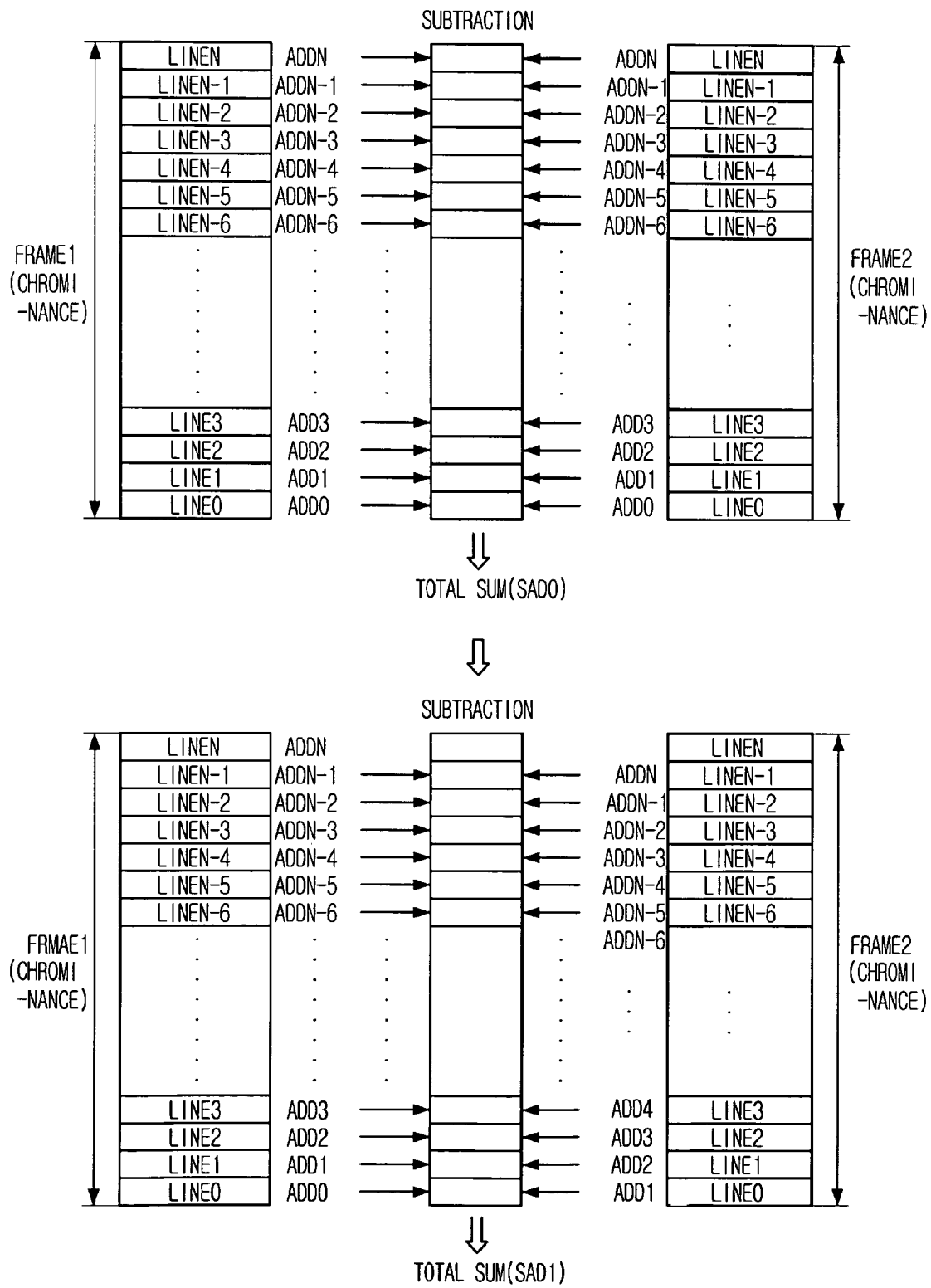

Rather than the chrominance average values stored in the storages 22 and 42 are not compared to each other according to the corresponding addresses in each of the storages 22 and 42, the chrominance average values of the first frame FRAME1 stored in the second storage 22 are fixed and the chrominance average values of the second frame FRAME2 stored in the fourth storage 42 are varied by changing addresses of the fourth storage 42, and then the chrominance average values of the second frame FRAME2 are subjected to the comparison with and the subtraction from those of the first frame FRAME1, thereby estimating the offset in the second frame FRAME2. At this time, a variably changed address range is set to a certain value by a user. For example, the variably changed address range may be set within an address range ADD0 to ADD3 In a concrete way, as shown in FIG. 7, while the second storage 22 sequentially increases a comparative address from 'ADD0' to 'ADDN', and the fourth storage 42 sequentially increases a comparative address from 'ADD0' to 'ADDN', the subtraction of the chrominance average values of the second frame FRAME2 from those of the first frame FRAME1 is executed and an SDA of the subtracted values is calculated.

First, a chrominance average value of the second frame FRAME2 stored in the address 'ADD0' of the fourth storage 42 is subtracted from the chrominance average value of the first frame FRAME1 stored in the address 'ADD0' of the second storage 22, a chrominance average value of the second frame FRAME2 stored in an address 'ADD1' of the fourth storage 42 is subtracted from a chrominance average value of the first frame FRAME1 stored in an address 'ADD1' of the second storage 22, a chrominance average value of the second frame FRAME2 stored in an address 'ADD2' of the fourth storage 42 is subtracted from the chrominance average value of the first frame FRAME1 stored in an address 'ADD2' of the second storage 22, . . . and a chrominance average value of the second frame FRAME2 stored in the address 'ADDN' of the fourth storage 42 is subtracted from a chrominance average value of the first frame FRAME1 stored in the address 'ADDN' of the second storage 22. Thus obtained subtracted values are summed as an SAD0.

Then, after increasing an address value of the fourth storage 42 by one, the subtraction with respect to the chrominance average values in the first and second frames FRAME1 and FRAME2 of each address of the second and fourth storages 22 and 42 is carried out. That is to say, the chrominance average value of the second frame FRAME2 stored in the address 'ADD1' of the fourth storage 42 is subtracted from the chrominance average value of the first frame FRAME1 stored in the address 'ADD0' of the second storage 22, the chrominance average value of the second frame FRAME2 stored in the address 'ADD2' of the fourth storage 42 is subtracted from the chrominance average value of the first frame FRAME1 stored in the address 'ADD1' of the second storage 22, the chrominance average value of the second frame FRAME2 stored in an address 'ADD3' of the fourth storage 42 is subtracted from the chrominance average value of the first frame FRAME1 stored in the address 'ADD2' of the second storage 22, . . . and the chrominance average value of the second frame FRAME2 stored in the address 'ADDN' of the fourth storage 42 is subtracted from a chrominance average value of the first frame FRAME1 stored in an address 'ADDN1' of the second storage 22. Thus obtained subtraction values are summed as an SAD1.

The above process is carried out within a given address range, i.e., an address range of ADD0 to ADD3. In this case, the address range may be suitably chosen in a range where a distortion in an image quality does not occur.

When one of the chrominance average values of the second frame FRAME2 stored in the fourth storage 42 is closest to one of the chrominance average values of the first frame FRAME1 stored in the second storage 22 through the above process, the luminance average value corresponding to that point is set to a final reference value.

For example, if a minimum value is SAD1 among SAD0 to SAD3 in case where the address range is set to ADD0 to ADD3, the minimum value SAD1 is set to a final reference value. Therefore, the flicker curve generating unit 60 sets SAD1 as a reference value in subtracting the luminance average values of the second frame FRAME2 stored in the third storage 41 from the luminance average values of the first frame FRAME1 stored in the first storage 21.

The flicker curve generating unit 60 has a flicker curve extractor 61 for extracting a flicker curve based on the final reference value of the second frame FRAME2 that is corrected based on the offset information estimated from the motion estimating unit 50, and a filter 62 for filtering the flicker curve extracted at the flicker curve extractor 61.

The flicker curve extractor 61 extracts the flicker curve by subtracting the luminance average values of the second frame FRAME2 stored in the third storage 41 from the luminance average values of the first frame FRAME1 stored in the first storage 21. At this time, the luminance average values of the second frame FRAME2 subtracted from the luminance average values of the first frame FRAME1 are luminance average values corrected based on the offset estimated at the motion estimator 50.

Figure 8:
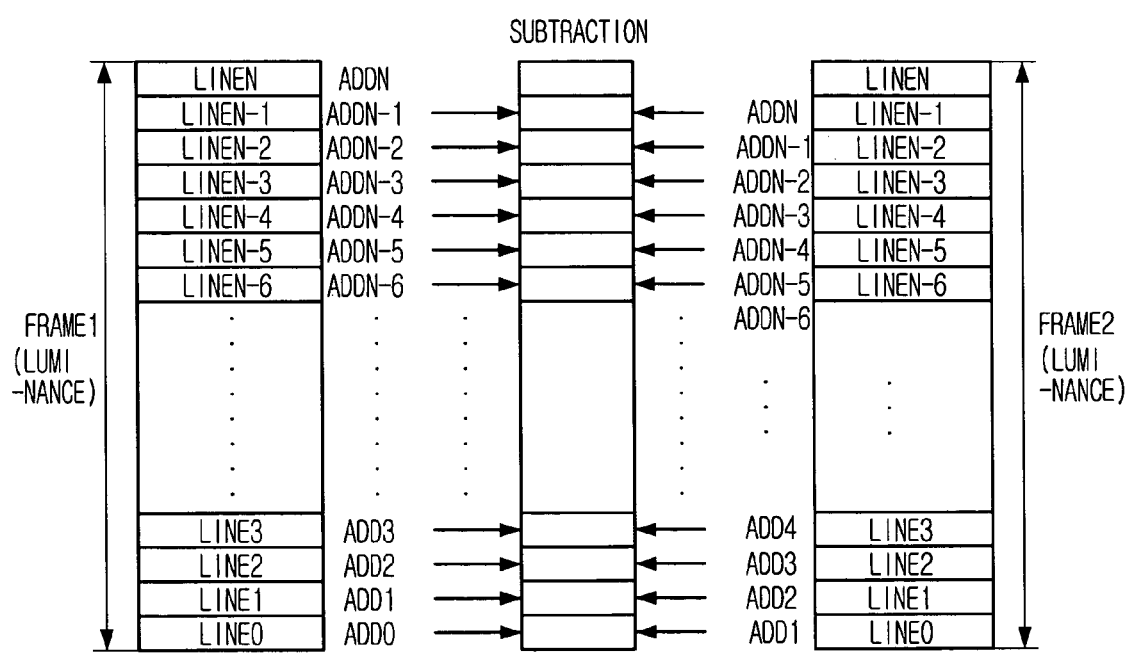
FIG. 8 is a view of illustrating an operational characteristic of a flicker curve detector shown in FIG. 4.

As an example, a case where the SAD1 described above is the final reference value is described. As shown in FIG. 8, the first storage 21 considers 'ADD0' as a beginning point of a subtraction address and the third storage 41 considers 'ADD1' as a beginning point of the subtraction address. That is to say, a luminance average value of the second frame FRAME2 stored in the address 'ADD1' of the third storage 41 is subtracted from a luminance average value of the first frame FRAME1 stored in the address 'ADD0' of the first storage 21, a luminance average value of the second frame FRAME2 stored in an address 'ADD2' of the third storage 41 is subtracted from a luminance average value stored in an address 'ADD1' of the first frame FRAME1 of the first storage 21, a luminance average value of the second frame FRAME2 stored in an address 'ADD3' of the third storage 41 is subtracted from a luminance average value of the first frame FRAME1 stored in an address 'ADD2' of the first storage 21, . . . and a luminance average value of the second frame FRAME2 stored in an address 'ADD0' of the third storage 41 is subtracted from the luminance average value of the first frame FRAME1 stored in an address 'ADDN' of the first storage 21.

The filter 62 performs a low-pass filtering for the flicker curve from the flicker curve extractor 61. The flicker curve from the flicker curve extractor 61 does not include only flicker information because of a light reception sensitivity and non-uniformity of the image pickup device and a circuit noise. Therefore, a low-pass filter is used to extract pure flicker curve information. Then information of the low-pass filter flicker curve from the flicker curve generating unit 60 is input to the flicker image detecting unit 70.

The flicker image detector 70 has a local minimum point extractor 71 for extracting points exhibiting local minimum values (valley parts) of the low-pass filtered flicker curve in order to determine a periodicity of the low-pass filtered flicker curve, and a flicker image determiner 72 for using the extracted local minimum points to determine whether a flicker is present or not.

The flicker image determiner 72 obtains a distance between each two neighboring local minimum points among the extracted local minimum points, classifies the obtained distances into several distance ranges according to their values, calculates the frequency number showing the number of distances included in each distance range, and compares the frequency number for each distance range with a first threshold. Then, if the frequency number is larger than the first threshold, the flicker image determiner 72 multiplies the frequency number by an average distance value of a corresponding distance range, e.g., 5 if the distance range is from 0 to 10, and then determines that the flicker is present if the multiplied value is larger than a second threshold, i.e., when the periodicity of flicker curve is out of a certain range.

A flicker detecting operation described above may be repetitively executed with respect to a predetermined number of frames. Namely, the units 10, 20, 30, 40, 50, 60 and 70 for detecting the flicker with respect to the first and second frames FRAME1 and FRAME2 repetitively execute the flicker detecting operation with respect to a predetermined number of consecutive frames, e.g., second and third frames, third and fourth frames, etc., and transmit flicker detecting information to the flicker state determining unit 80.

The flicker state determining unit 80 counts the detecting number of flicker image in the flicker image detecting information transmitted from the flicker image detecting unit 70. If the detecting number of flicker image with respect to the predetermined number of frames is equal to or larger than a third threshold, the flicker state determining unit 80 finally determines that a flicker is present in an entire photographed picture under current state and outputs a flicker state detecting signal. Thereafter, an automatic exposure device of the image sensor corrects an exposure time in response to the flicker state detecting signal.

Figure 9:
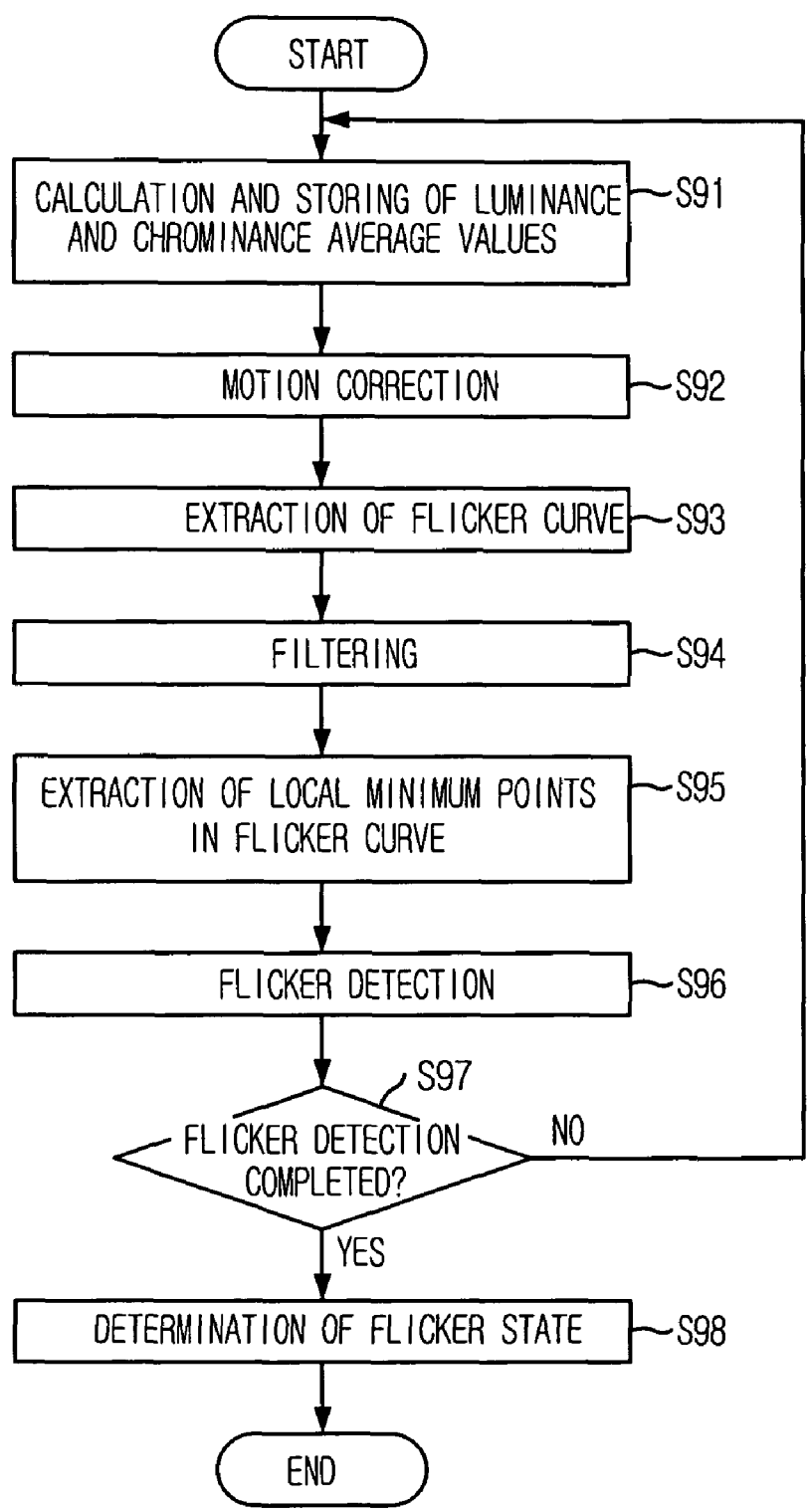
FIG. 9 is a flow chart of providing a flicker detecting method of the image sensor in accordance with the present invention.

FIG. 9 is a flow chart for illustrating a flicker detecting operation in accordance with a preferred embodiment of the present invention. This flicker detecting operation in the preferred embodiment of the present invention will be described hereinafter based on the flicker detecting circuit and operational characteristics thereof as shown in FIG. 4.

Figure 10:
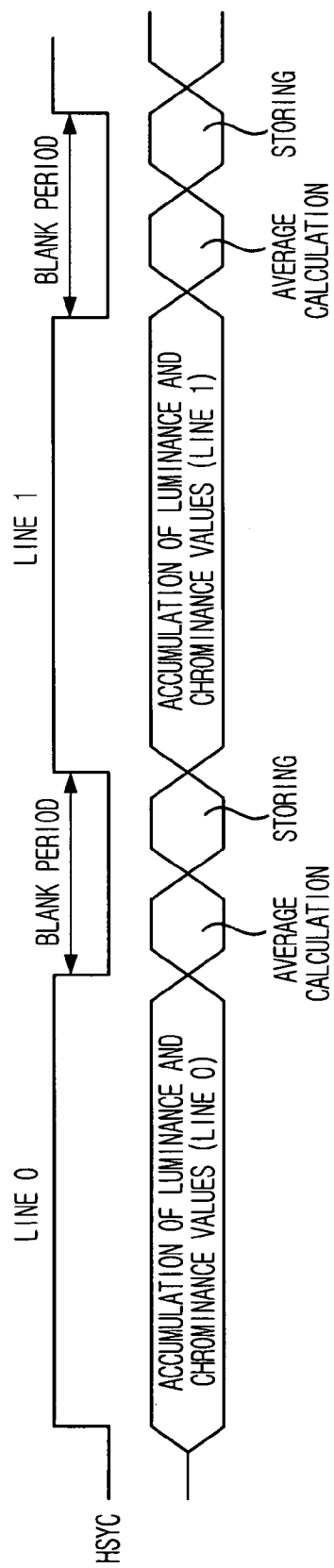
FIG. 10 is a timing diagram of illustrating a timing of calculating and storing averages of luminance and chrominance values shown in FIG. 9.

Referring to FIG. 9, at step S91, luminance average values and chrominance average values of pixel data RGB(1) of the first FRAME1 shown in FIG. 3 are calculated by the first luminance and chrominance average value generation unit 10 shown in FIG. 4 and then are respectively stored in the first and second storages 21 and 22 in a manner that the luminance average values and the chrominance average values are respectively classified with each row pixel line in the first frame FRAME1. In the rolling shutter scheme, data values of pixels in an image are sequentially output from respective row pixel lines. Therefore, as shown in FIG. 10, luminance values and chrominance values are calculated and accumulated from the data values for pixels output from the respective row pixel lines, and then the luminance average values and the chrominance average values for the respective row pixel lines are respectively calculated and stored in the first storage 21 and the second storage 22 during a blank period between a previous row pixel line LINE0 and a current row pixel line LINE1, i.e., when image values are not output, in response to a row pixel line data synchronization signal, i.e., a horizontal synchronization signal HSYC. That is, during the blank period between two row pixel lines, the luminance and chrominance average values of the previous row pixel line are calculated and stored in the first and the second storages 21 and 22, respectively. Subsequently, in the same manner described above, luminance average values and chrominance average values of pixel data RGB(2) of the second FRAME2 are calculated by the second luminance and chrominance average value generation unit 30 and then are respectively stored in the third and the fourth storages 41 and 42 in a manner that the luminance average values and the chrominance average values are respectively classified with row pixel lines in the second frame FRAME2.

Then, at step S92, a motion correction due to the shake is carried out. The motion correction is for correcting a mismatching between the first frame FRAME1 and the second frame FRAME2 caused by the shake when the first frame FRAME1 and subsequently the second frame FRAME2 are consecutively photographed. If a difference between a luminance value of a row pixel line extracted from the first frame FRAME1 and that of a row pixel line extracted from the second frame FRAME2 is obtained under a state that the motion correction is not performed, a flicker curve having an undesired offset is extracted.

The motion correction is achieved in the same manner as described with reference to FIGS. 5 to 7.

Figure 11:
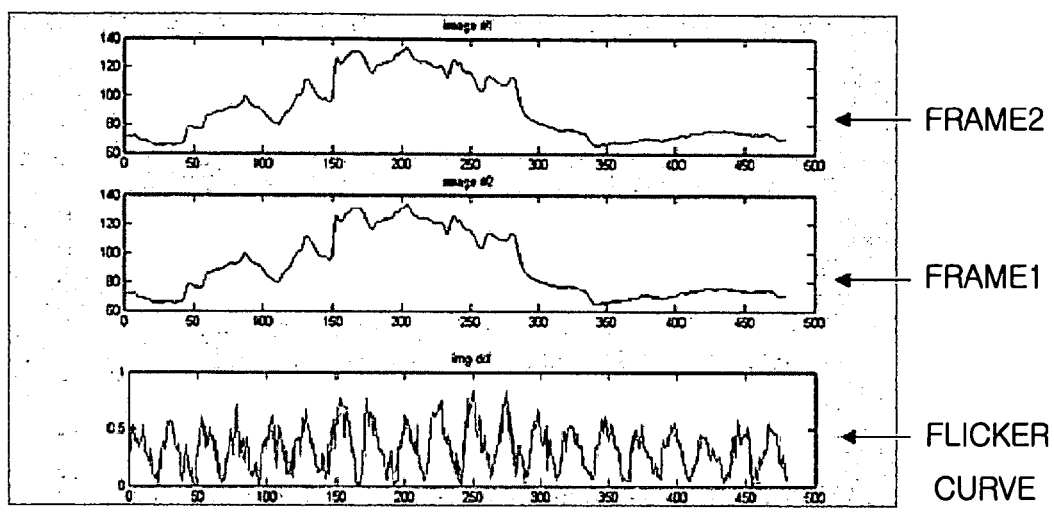
FIG. 11 is a view of showing a flicker curve extracted at the flicker curve detector shown in FIG. 4.

At step S93, a flicker curve is extracted by the flicker curve extractor 61. In case where the second frame FRAME2 does not have an undesired offset, i.e., there is no motion of the object, the flicker curve extractor 61 extracts a flicker curve by subtracting the luminance average values of the second frame FRAME2 stored in the third storage 41 from those of the first frame FRAME1 stored in the first storage 21 without the motion correction. Thus extracted flicker curve is shown in FIG. 11. That is, by subtracting the luminance average values of the second frame FRAME2 from those of the first frame FRAME1, detailed information for the object is cleared and, therefore, there is only a difference between the two frames, i.e., a lag of a flicker flow. In other words, the lag originated from the difference between the two frames results in the flicker curve shown in FIG. 11.

Figure 12:
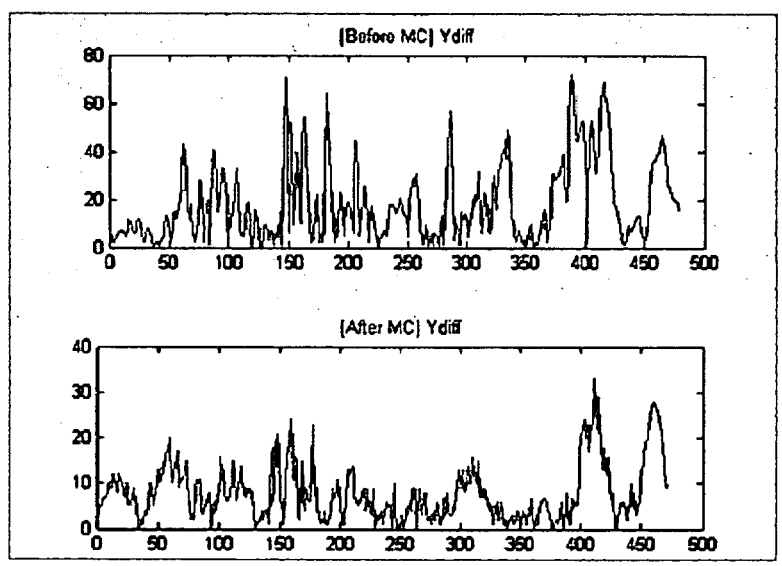
FIG. 12 is a view of showing a flicker curve extracted through a motion correcting process.

FIG. 12 is a block diagram for comparing a flicker curve without the motion correction and a flicker curve with the motion correction. That is, an upper waveform represents the flicker curve without the motion correction and a lower waveform represents the flicker curve with the motion correction.

As seen from FIG. 12, since the motion caused by the hand shake in up and down directions should be corrected to obtain an exactly estimated result, a flicker curve can be more exactly extracted with the motion correction than that extracted without the motion correction.

Subsequently, at step S94, the extracted flicker curve is filtered. The flicker curve extracted by the flicker curve extractor 61 does not include exact flicker information due to a light reception sensitivity and non-uniformity of the image pickup device and a circuit noise. Therefore, at step S94, in order to solve this problem, the extracted flicker curve is low-pass filtered in the filer 62 such that only the exact flicker information is extracted.

Figure 13:
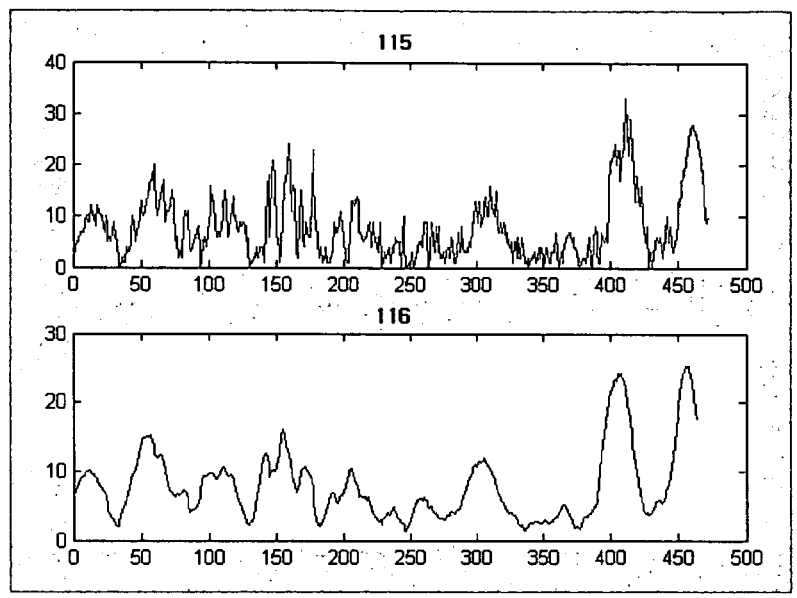
FIG. 13 is a view of showing a flicker curve filtered at a filtering unit shown in FIG. 4.

FIG. 13 is a view for comparing a flicker curve with a filtered flicker extracted after the low-pass filtering is carried out. That is, an upper waveform represents the flicker curve and a lower waveform represents the filtered flicker curve.

At step S95, a periodicity of the filtered flicker curve is determined and then it is determined whether the periodicity is originated from the flicker band.

The method of determining the periodicity thereof will be described hereinafter.

Figure 14:
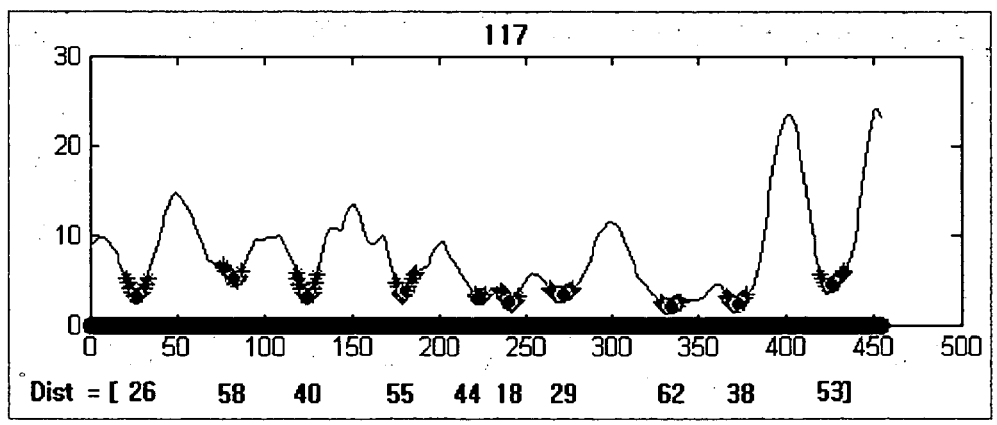
FIG. 14 is a view of calculating a distance between a local minimum point and a next local minimum point in a filtered flicker curve.

First, as shown in FIG. 14, a plurality of local minimum points of the flicker curve are obtained by the local minimum point extractor 71.

Then, at step S96, the flicker image determiner 72 figures out the distance Dist between two neighboring local minimum points of the obtained local minimum points and determines the flicker curve as a curve formed by the flicker band based on the distances of the local minimum points as described above with reference to FIG. 4.

Figure 15:
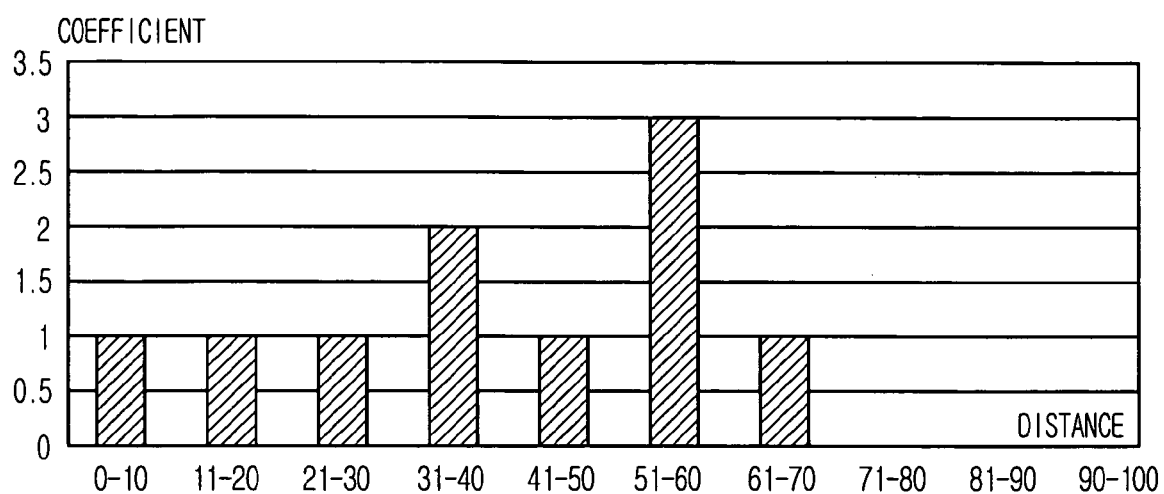
FIG. 15 is a histogram for illustrating coefficients exhibiting the frequency numbers of distance values.

As exemplarily illustrated in FIG. 15, in order to obtain the frequency numbers of the distances between local minimum points in the flicker curve, the distances are counted and recorded in a storage medium, such as a SRAM, in the form of histogram having a plurality of distance ranges classified according to the distance values. A coefficient recorded in the form of histogram represents the number of distances accumulated in a distance range corresponding to the coefficient, i.e., the frequency number. Then, the coefficients for the plurality of distance ranges are respectively compared with a threshold, e.g., a first threshold and, if there is at least one coefficient larger than the first threshold, the coefficient is multiplied with an average distance value of a corresponding distance range and the multiplied value becomes a representative value exhibiting a degree of flicker displayed on a display, and a flicker is detected when the representative value is larger than a threshold, e.g., a second threshold.

The extraction of the flicker curve and the determination of the flicker as described above can be repetitively executed for a predetermined number of frames, and lead to determine whether each frame includes a flicker, thereby counting the detecting number of the flicker.

That is, at step S97, it is determined whether the flicker detecting operation is repetitively executed with respect to the predetermined number of frames. If the detecting operation is not completed for the predetermined number of frames, then the process is returned back to the step S91 to repeat the flicker detecting operation for a subsequent frame; and if otherwise, then the process proceeds to step S98.

At step S98, the flicker state determining unit 80 compares the detecting number of flicker with a threshold, e.g., a third threshold, to determine that a flicker is present in the photographed image if the detecting number is equal to or larger than the third threshold and reports this result to an automatic exposure device. Then the automatic exposure device recalculates an exposure time based on the flicker detection result.

FIG. 16 shows a flicker detecting circuit 200 in accordance with another preferred embodiment of the present invention. While the flicker detecting circuit 100 in accordance with the preferred embodiment shown in FIG. 4 detects the flicker curve with respect to the two neighboring frames to detect a flicker, the flicker detecting circuit 200 shown in FIG. 16 is implemented such that flicker curves are extracted in parallel with respect to a plurality of, e.g., M, frames, M being an integer larger than 2.

The flicker detecting circuit 200 includes an average value generation unit 110 (110-1 to 110-M) for detecting luminance and chrominance average values of respective row pixel lines for the M frames, a storage unit 120 (120-1 to 120-M) for storing the average values in a manner that the luminance average values and the chrominance average values are classified with the respective row pixel lines with respect to the M frames, a motion estimating unit 150 for estimating motions of a second to Mth frames, a flicker curve generating unit 160 for compensating a motion of a corresponding frame based on the estimated result of the motion estimating unit 150 and extracting a plurality of flicker curves (e.g., M−1 flicker curves) caused by differences between respective two neighboring frames, a flicker image detecting unit 170 for determining whether each of the flicker curves has a flicker image by using the M−1 flicker curves, and a flicker state determining unit 180 for counting the detecting number of flicker, determining that there exists a flicker in the photographed image if the detecting number of flicker is equal to or larger than a threshold, and transmitting the determined result to an automatic exposure device in the image sensor. These components in the flicker detecting circuit 200 similarly operate as described referring to FIG. 4 and thus details of the construction and operation thereof are not described herein.

As described above, the present invention is advantageously independent on an object by using differences of luminance values of at least two frames to extract flicker curves, and can avoid efficiency degradation in a semiconductor-implemented area because it is constructed of purely digital processing circuits.

Further, the present invention does not degrade efficiency in a semiconductor-implemented area because it does not employ a separate operating circuit by using a histogram in determining a periodicity of a flicker curve to reuse a storage medium, e.g., SRAM, built in an image sensor.

The present application contains subject matters related to the Korean patent application No. KR 2005-0127857, file in the Korean Patent Office on Dec. 22, 2005, the entire contents of which being incorporated herein by reference.

While the scope of the present invention has been described with respect to the preferred embodiments, these embodiments are for illustrating the present invention and are not to be construed to limit the present invention. In other words, in accordance with the present invention, it is possible to determine whether a flicker is present or not in all system which photograph an image by using a rolling shutter scheme. Further, those skilled in the art will appreciate that various modifications, changes and variations can be made to the preferred embodiments of the present invention as fall within the true spirit and scope of this present invention.

What is claimed is:

1. A device comprising:
 a luminance average value output unit operable to extract luminance values from pixel data of a first frame and a second frame to generate first luminance average values for pixel lines of the first frame and second luminance average values for pixel lines of the second frame;
 a flicker curve generating unit operable to subtract the second luminance average values from the first luminance average values to generate a flicker curve;
 a flicker detecting unit operable to extract a plurality of local minimum points from the flicker curve, determine a distance between pairs of neighboring local minimum points of the extracted local minimum points, and determine whether the flicker is present based on the distances and the frequency numbers of the distances; and
 a chrominance average value output unit operable to detect chrominance values from the pixel data of the first frame and the second frame, generate first chrominance average values for the pixel lines of the first frame, and generate second chrominance average values for the pixel lines of the second frame.

2. The device of claim 1, wherein the luminance average value output unit includes:
 a first luminance average value generator operable to extract the luminance values from the pixel data of the first frame to generate the first luminance average values; and
 a second luminance average value generator operable to extract the luminance values from the pixel data of the second frame to generate the second luminance average values.

3. The device of claim 2, wherein the first luminance average value generator comprises:
 a first detector operable to detect a luminance value of each pixel from the pixel data of the first frame;
 a first accumulator operable to accumulate, for each pixel line, the luminance value of each pixel output from the first detector; and
 a first average value calculator operable to average luminance values accumulated by the first accumulator to generate the first luminance average values.

4. The device of claim 3, wherein the second luminance average value generator comprises:
 a second detector operable to detect a luminance value of each pixel from the pixel data of the second frame;
 a second accumulator operable to accumulate, for each pixel line, the luminance value of each pixel output from the second detector; and
 a second average value calculator operable to average luminance values accumulated by the second accumulator to generate the second luminance average values.

5. The device of claim 4, wherein the luminance average value output unit further comprises a storage operable to store the first luminance average and the second luminance average.

6. The device of claim 5, wherein the storage comprises a static random access memory (SRAM) in an image sensor.

7. The device of claim 1, wherein the flicker curve generating unit comprises:
 a flicker curve extractor operable to subtract the second luminance average values from the first luminance average values to extract the flicker curve; and
 a filter operable to filter the flicker curve extracted from the flicker curve extractor.

8. The device of claim 7, wherein the filter is a low-pass filter.

9. The device of claim 1, wherein the chrominance average value output unit comprises:
 a chrominance average value generator operable to detect the chrominance values from the pixel data of the first frame and the second frame to generate the first chrominance average values and the second chrominance average values; and
 a storage operable to store the first chrominance average values and the second chrominance average values.

10. The device claim 9, further comprising:
 a motion estimating unit operable to estimate a motion of the second frame by using the first chrominance average values and the second chrominance average values, wherein the flicker curve generating unit is operable to compensate the second luminance average values by using the motion estimated result to generate the flicker curve.

11. The device of claim 10, wherein the motion estimating unit is operable to compare the first chrominance average values with the second chrominance average values while fixing the first chrominance average values and changing the second chrominance average values.

12. The device of claim 11, wherein the motion estimating unit is operable to subtract the second chrominance average values from the first chrominance average values while fixing a beginning point of addresses where the first chrominance average values are stored and sequentially changing a beginning point of addresses where the second chrominance average values are stored, and then determine a total sum of the subtracted values to estimate a point where the total sum of the subtracted values has the smallest value as a motion of the second frame.

13. The device of claim 1, wherein the flicker detecting unit comprises:
 a local minimum point extractor operable to extract a plurality of local minimum points in the flicker curve; and
 a flicker image determiner operable to obtain a distance between pairs of neighboring local minimum points of the plurality of local minimum points, classify the obtained distance into a plurality of distance ranges, determine the frequency number showing the number of distances classified into each of the distance ranges, compare the determined frequency number with a first threshold, multiply the determined frequency number by an average distance value of a corresponding distance range if the determined frequency number is larger than the first threshold, and determine that a flicker is present if the multiplied value is larger than a second threshold.

14. The device of claim 13, wherein the flicker image determiner is operable to count and record the distance between pairs of neighboring local minimum points extracted from the flicker curve into a storage medium in the form of histogram to obtain the frequency number, the histogram including the plurality of distance ranges.

15. The device of claim 1, wherein the image photograph is achieved by employing a rolling shutter scheme.

16. A device comprising:
a luminance average value output unit operable to extract luminance values from pixel data of M−1 neighboring frame pairs among M frames, M being an integer larger than 2, to generate first luminance average values for pixel lines of a first frame of each frame pair and second luminance average values for pixel lines of a second frame of said each frame pair;
a flicker curve generation unit operable to subtract the second luminance average values from the first luminance average values to generate a flicker curve;
a flicker image detecting unit operable to extract a plurality of local minimum points from the flicker curve, determine a distance between pairs of neighboring local minimum points of the extracted local minimum points, and detect a flicker image based on the distances and the frequency numbers of the distances; and
a flicker state determining unit operable to determine whether a flicker is present based on the detecting number of the flicker images when the detection of the flicker image is completed with respect to the M frames.

17. The device of claim 16, wherein the luminance average value output unit comprises:
a first luminance average value generator operable to extract the luminance values from the pixel data of the first frame to generate the first luminance average values; and
a second luminance average value generator operable to extract the luminance values from the pixel data of the second frame to generate the second luminance average values.

18. The device of claim 17, wherein the first luminance average value generator comprises:
a first detector operable to detect a luminance value of each pixel from the pixel data of the first frame;
a first accumulator operable to accumulate, for each pixel line, the luminance value of each pixel output from the first detector; and
a first average value calculator operable to average luminance values accumulated by the first accumulator to generate the first luminance average values.

19. The device of claim 18, wherein the second luminance average value generator comprises:
a second detector operable to detect a luminance value of each pixel from the pixel data of the second frame;
a second accumulator operable to accumulate, for each pixel line, the luminance value of each pixel output from the second detector; and
a second average value calculator operable to average luminance values accumulated by the second accumulator to generate the second luminance average values.

20. The device of claim 19, wherein the luminance average value output unit further comprises a storage operable to store the first luminance average and the second luminance average.

21. The device of claim 20, wherein the storage comprises a static random access memory (SRAM) in an image sensor.

22. The device of claim 16, wherein the flicker curve generating unit comprises:
a flicker curve extractor operable to subtract the second luminance average values from the first luminance average values to extract the flicker curve; and
a filter operable to filter the flicker curve extracted from the flicker curve extractor.

23. The device of claim 22, wherein the filter is a low-pass filter.

24. The device of claim 16, further comprising:
a chrominance average value output unit operable to detect chrominance values from the pixel data of the first frame and the second frame to generate first chrominance average values for the pixel lines of the first frame and second chrominance average values for the pixel lines of the second frame.

25. The device of claim 24, wherein the chrominance average value output unit comprises:
a chrominance average value generator operable to detect the chrominance values from the pixel data of the first frame and the second frame to generate the first chrominance average values and the second chrominance average values; and
a storage operable to store the first chrominance average values and the second chrominance average values.

26. The device of claim 25, further comprising:
a motion estimating unit operable to estimate a motion of the second frame by using the first chrominance average values and the second chrominance average values,
wherein the flicker curve generating unit is operable to compensate the second luminance average values by using the motion estimated result to generate the flicker curve.

27. The device of claim 26, wherein the motion estimating unit is operable to compare the first chrominance average values with the second chrominance average values while fixing the first chrominance average values and changing the second chrominance average values.

28. The device of claim 27, wherein the motion estimating unit is operable to subtract the second chrominance average values from the first chrominance average values while fixing a beginning point of addresses where the first chrominance average values are stored and sequentially changing a beginning point of addresses where the second chrominance average values are stored, and then determine a total sum of the subtracted values to estimate a point where the total sum of the subtracted values has the smallest value as a motion of the second frame.

29. The device of claim 16, wherein the flicker detecting unit comprises:
a local minimum point extractor operable to extract a plurality of local minimum points in the flicker curve; and
a flicker image determiner operable to obtain a distance between pairs of neighboring local minimum points of the plurality of local minimum points, classify the obtained distance into a plurality of distance ranges, determine the frequency number showing the number of distances classified into each of the distance ranges, compare the determined frequency number with a first threshold, multiply the determined frequency number by an average distance value of a corresponding distance range if the determined frequency number is larger than the first threshold, and determined that a flicker is present if the multiplied value is larger than a second threshold.

30. The device of claim 29, wherein the flicker image determiner is operable to count and record the distance between pairs of neighboring local minimum points extracted from the flicker curve into a storage medium in the form of histogram to obtain the frequency number, the histogram including the plurality of distance ranges.

31. The device of claim 29, wherein the flicker state determining unit is operable to determine that the flicker is present in the photographed image if the detecting number of the flicker images is equal to or larger than a third threshold.

32. The device of claim 16, wherein the image photograph is achieved by employing a rolling shutter scheme.

33. A device comprising:
a luminance average value output unit operable to extract luminance values from pixel data of M frames to generate luminance average values for pixel lines of each of the M frames, M being an integer larger than 2;
a flicker curve generating unit operable to determine luminance average value differences between two frames constituting a frame pair based on the luminance average values for the pixel lines of the frame pair, the M frames being classified into (M−1) frame to generate (M−1) flicker curves by using the differences;
a flicker image detecting unit operable to extract a plurality of local minimum points from each of the (M−1) flicker curves, determine a distance between pairs of neighboring local minimum points of the extracted local minimum points, and detect a flicker image from each of the flicker curves based on the distances and the frequency number of the distances; and
a flicker state determining unit operable to determine whether the flicker is present based on the detecting number of the flicker images when the detection of the flicker images is completed with respect to all of the M frames,
wherein the flicker curve generating unit includes a flicker curve extractor operable to determine luminance average value differences between two frames constituting a frame pair based on the luminance average values for the pixel lines of the frame pair, the M frames being classified into (M−1) frame to generating (M−1) flicker curves by using the differences; and a filter operable to filter the flicker curves output from the flicker curve extractor.

34. The device of claim 33, wherein the luminance average value output unit comprises M luminance value generators operable to extract luminance values from the pixel data of the M frames to generate the luminance average values for pixel lines of each of the M frames.

35. The device of claim 34, wherein each of the M luminance value generators comprises:
a first detector operable to detect a luminance value of each pixel from the pixel data of a corresponding frame of the M frames;
a first accumulator operable to accumulate the luminance values for each pixel line of the corresponding frame; and
an average value calculator operable to average the luminance values accumulated by the first accumulator to generate a luminance average value for said each pixel line of the corresponding frame.

36. The device of claim 35, wherein each of the luminance average value generators further comprises a storage operable to store the luminance average values for all pixel lines of the corresponding frame.

37. The device of claim 36, wherein the storage is a static random access memory(SRAM) in an image sensor.

38. The device of claim 33, wherein the filter is a low-pass filter.

39. The device of claim 33, further comprising a chrominance average value output unit operable to extract chrominance values from the pixel data of the M frames to generate chrominance average values for the pixel lines of each of the M frames.

40. The device of claim 39, wherein the chrominance average value output unit comprises:
a chrominance average value generator operable to detect the chrominance values from the pixel data of the M frames to generate the chrominance average values for the pixel lines of each of the M frames; and
a storage operable to store the chrominance average values.

41. The device of claim 40, further comprising:
a motion estimating unit operable to estimate a motion of a second frame of two frames, which constitutes one frame pair of the (M−1) neighboring frame pairs by using chrominance average value differences between the two frames,
wherein the flicker curve generating unit is operable to compensate the luminance average values of the second frame by using the motion estimated result to generate a corresponding flicker curve.

42. The device of claim 41, wherein the motion estimating unit is operable to compare chrominance average values of a first frame of the two frames and second chrominance average values of the second frame of the two frames while fixing the chrominance average values of the first frame and changing the chrominance average values of the second frame.

43. The device of claim 42, wherein the motion estimating unit is operable to subtract the chrominance average values of the second frame from the first chrominance average values of the first frame while fixing a beginning point of addresses where the chrominance average values of the first frame are stored and sequentially changing a beginning point of addresses where the chrominance average values of the second frame are stored, and then determine a total sum of the subtracted values to estimate a point where the total sum of the subtracted values has the smallest value as a motion of the second frame.

44. The device of claim 33, wherein the flicker image detecting unit comprises:
a local minimum point extractor operable to extract a plurality of local minimum points from each of the (M−1) flicker curves; and
a flicker image determiner operable to obtain a distance between pairs of neighboring local minimum points of the plurality of local minimum points, classify the obtained distance into a plurality of distance ranges, determine the frequency number showing the number of distances classified into each of the distance ranges, compare the determined frequency number with a first threshold, multiply the determined frequency number by an average distance value of a corresponding distance range if the determined frequency number is larger than the first threshold, and determine that a flicker is present if the multiplied value is larger than a second threshold.

45. The device of claim 44, wherein the flicker image determiner is operable to count and record the distance between pairs of neighboring local minimum points extracted from the flicker curve into a storage medium in the form of histogram to obtain the frequency number, the histogram including the plurality of distance ranges.

46. The device of claim 44, wherein the flicker state determining unit is operable to determine that the flicker is present in the photographed image if the detecting number of the flicker images with respect to the M frames is equal to or larger than a third threshold.

47. The device of claim 33, wherein the image photograph is achieved by employing a rolling shutter scheme.

48. A method for detecting a flicker in an image sensor, the method comprising:
    extracting luminance values from pixel data of a first frame obtained by photographing an image to generate first luminance average values for pixel lines of the first frame;
    extracting luminance values from pixel data of a second frame obtained by consecutively photographing the image to generate second luminance average values for pixel lines of the second frame;
    subtracting the second luminance average values from the first luminance average values to generate a flicker curve; and
    extracting a plurality of local minimum points from the flicker curve to determine a distance between pairs of neighboring local minimum points of the extracted local minimum points and detecting a flicker image based on the distances and the frequency numbers of the distances, wherein:
    the generating of the flicker curve includes subtracting the second luminance average values from the first luminance average values, thereby extracting the flicker curve, and filtering the flicker curve; and
    the filtering of the flicker curve is executed by using a low-pass filter.

49. The method of claim 48, wherein the generating of the first luminance average values includes:
    detecting luminance values of all pixels in the first frame;
    accumulating the luminance values for each pixel line of the first frame; and
    averaging the accumulated luminance values to generate the first luminance average values for the pixel lines of the first frame.

50. The method of claim 49, wherein the generating of the second luminance average value includes:
    detecting luminance value of all pixels in the second frame;
    accumulating the luminance values for each pixel line of the second frame; and
    averaging the accumulated luminance values to generate the second luminance average values for the pixel lines of the second frame.

51. A method for detecting a flicker in an image sensor, the method comprising:
    extracting luminance values from pixel data of a first frame obtained by photographing an image to generate first luminance average values for pixel lines of the first frame;
    extracting luminance values from pixel data of a second frame obtained by consecutively photographing the image to generate second luminance average values for pixel lines of the second frame;
    subtracting the second luminance average values from the first luminance average values to generate a flicker curve; and
    extracting a plurality of local minimum points from the flicker curve to determine a distance between pairs of neighboring local minimum points of the extracted local minimum points and detecting a flicker image based on the distances and the frequency numbers of the distances,
    wherein the detecting of the flicker image includes determining a periodicity of the flicker curve, and determining that the flicker image is present if the periodicity of the flicker curve is out of a certain range.

52. The method of claim 51, wherein the detecting of the flicker image includes:
    extracting a plurality of local minimum points in the flicker curve;
    obtaining a distance between pairs of neighboring local minimum points of the plurality of local minimum points;
    classifying the obtained distances into a plurality of distance ranges;
    determining the frequency number showing the number of distances included in each of the distance ranges;
    comparing the determined frequency numbers corresponding to all of the distance ranges with a first threshold to detect the frequency number larger than a first threshold;
    multiplying the detected frequency number and an average distance corresponding to the detected frequency number; and
    determining that a flicker is present if a multiplied value of the detected frequency number and the average distance is larger than a second threshold.

53. The method of claim 52, wherein the determining of the frequency number has counting and recording the distance between pairs of neighboring local minimum points extracted from the flicker curve into a storage medium in the form of histogram in order to obtain the frequency number.

54. The method of claim 48, further comprising:
    repeating, with respect to M frames, M being an integer larger than 2, the generating of the first luminance average values, the generating of the second luminance average values, the generating of the flicker curve and the detecting of the flicker image, and counting the detecting number of the flicker images; and
    determining whether the flicker is present based on the counted detecting number of the flicker images.

55. A method for detecting a flicker in an image sensor, the method comprising:
    extracting luminance and chrominance values from pixel data of a first frame obtained by photographing an image to generate first luminance average values and first chrominance average values for pixel lines of the first frame;
    extracting luminance and chrominance values from pixel data of a second frame obtained by consecutively photographing the image to generate second luminance average values and second chrominance average values for pixel lines of the second frame;
    estimating a motion of the second frame by using the first chrominance average values and the second chrominance average values;
    correcting the second luminance average values based on the estimated motion of the second frame;
    subtracting the corrected second luminance average values from the first luminance average values to generate a flicker curve; and
    extracting a plurality of local minimum points from the flicker curve to determine a distance between pairs of neighboring local minimum points of the extracted local minimum points and detecting a flicker image based on the distances and the frequency numbers of the distances.

56. The method of claim 55, wherein the generating of the first luminance and chrominance average values includes:
- detecting luminance values and chrominance values of all pixels in the first frame;
- accumulating the luminance and chrominance values for the pixel lines of the firs frame; and
- averaging the accumulated luminance and chrominance values, thereby generating the first luminance average values and the first chrominance average values.

57. The method of claim 56, wherein the generating of the second luminance and chrominance average values includes:
- detecting luminance values and chrominance values of all pixels in the second frame;
- accumulating the luminance and chrominance values for the pixel lines of the second frame; and
- averaging the accumulated luminance and chrominance values, thereby generating the second luminance average values and the second chrominance average values.

58. The method of claim 55, wherein the estimating of the motion of the second frame includes:
- subtracting the second chrominance average values from the first chrominance average values while fixing a beginning point of addresses where the first chrominance average values are stored and sequentially changing a beginning point of addresses where the second chrominance average values are stored to determine total sums of the subtracted values; and
- comparing the determined total sums to estimate a changing point where a total sum has the smallest value as a motion of the second frame.

59. The method of claim 58, wherein the correcting of the second luminance average values includes setting the first luminance average values corresponding to the estimated motion as the corrected second luminance average values.

60. The method of claim 55, wherein the generating of the flicker curve includes:
- subtracting the corrected second luminance average values from the first luminance average values to extract a flicker curve; and
- filtering the flicker curve.

61. The method of claim 60, wherein the filtering of the flicker curve is executed by using a low pass filter.

62. The method of claim 55, wherein the detecting of the flicker image includes:
- determining a periodicity of the flicker curve; and
- determining that the flicker image is present if the periodicity of the flicker curve is out of a certain range.

63. The method of claim 62, wherein the detecting of the flicker image includes:
- extracting a plurality of local minimum points in the flicker curve;
- obtaining a distance between pairs of neighboring local minimum points of the plurality of local minimum points;
- classifying the obtained distances into a plurality of distance ranges;
- determining the frequency number showing the number of distances included in each of the distance ranges;
- comparing the determined frequency numbers corresponding to all of the distance ranges with a first threshold to detect the frequency number larger than a first threshold;
- multiplying the detected frequency number and an average distance corresponding to the detected frequency number; and
- determining that a flicker is present if a multiplied value of the detected frequency number and the average distance is larger than a second threshold.

64. The method of claim 63, wherein the determining of the frequency number has counting and recording the distance between pairs of neighboring local minimum points extracted from the flicker curve into a storage medium in the form of histogram in order to obtain the frequency number.

65. The method of claim 55, further comprising:
- repeating, with respect to M frames, M being an integer larger than 2, the generating of the first luminance and the first chrominance average values, the generating of the second luminance and the second chrominance average values, the estimating and correcting of the motion, the generating of the flicker curve and the detecting of the flicker image, and counting the detecting number of flicker images; and
- determining whether the flicker is present based on the counted detecting number of the flicker images.

66. A method, comprising
- generating first luminance average values and first chrominance average values for pixel lines of a first frame;
- generating second luminance average values and second chrominance average values for pixel lines of a subsequent second frame;
- estimating motion between the first frame and the second frame based upon the first chrominance average values and the second chrominance average values;
- generating a motion compensated flicker curve using estimated motion between the first frame and the second frame to obtain differences between first luminance values and corresponding second luminance values; and
- detecting flicker based on the motion compensated flicker curve.

67. The method of claim 66, further comprising adjusting an exposure time based on the flicker detected.

68. The method of claim 66, wherein said detecting flicker comprises:
- determining a periodicity of the motion compensated flicker curve; and
- determining that flicker is present if the periodicity of the motion compensated flicker curve is out of a certain range.

69. An apparatus, comprising:
- a pixel array comprising a plurality of pixel lines operable to capture frames;
- a first luminance and chrominance average value generation unit configured to receive pixel data of a first frame captured by the pixel array and generate a first luminance average value and a first chrominance average value for pixel lines of the first frame;
- a second luminance and chrominance average value generation unit operable to receive pixel data of a second frame captured by the pixel array and generate a second luminance average value and a second chrominance average value for pixel lines of the second frame;
- a motion estimating unit operable to estimate an offset between the first frame and the second frame based on the first chrominance average values for the first frame and the second chrominance average values for the second frame; and
- a flicker curve extractor operable to extract a motion compensated flicker curve from the first luminance average values for the first frame and the second luminance average values for the second frame based on the offset determined by the motion estimating unit; and
- a flicker image detector operable to detect flicker based on the motion compensated flicker curve.

70. The apparatus of claim 69, wherein the flicker curve extractor is configured to generate the motion compensated flicker curve based on differences obtained between first luminance average values and corresponding second luminance average values.

71. The apparatus of claim 69, wherein the flicker curve extractor is configured to identify corresponding first luminance average values and second luminance average values based on the offset and generate the motion compensated flicker curve based on differences obtained between first luminance average values and corresponding second luminance average values.

* * * * *

UNITED STATES PATENT AND TRADEMARK OFFICE
CERTIFICATE OF CORRECTION

| | | |
|---|---|---|
| PATENT NO. | : 7,965,323 B2 | Page 1 of 1 |
| APPLICATION NO. | : 11/642597 | |
| DATED | : June 21, 2011 | |
| INVENTOR(S) | : Lee et al. | |

It is certified that error appears in the above-identified patent and that said Letters Patent is hereby corrected as shown below:

Column 14, line 38, in Claim 10, delete "device" and insert -- device of --.

Column 18, line 6, in Claim 37, delete "memory(SRAM)" and insert -- memory (SRAM) --.

Column 21, line 6, in Claim 56, delete "firs" and insert -- first --.

Column 21, line 42, in Claim 61, delete "low pass" and insert -- low-pass --.

Column 22, line 17, in Claim 66, delete "comprising" and insert -- comprising: --.

Signed and Sealed this
Eighteenth Day of October, 2011

David J. Kappos
*Director of the United States Patent and Trademark Office*